United States Patent
Owens

(10) Patent No.: US 9,452,772 B2
(45) Date of Patent: Sep. 27, 2016

(54) STEERING COLUMN ASSEMBLY

(75) Inventor: Thomas Reginald Owens, Solihull (GB)

(73) Assignee: TRW AUTOMOTIVE US LLC, Livonia, MI (US)

( * ) Notice: Subject to any disclaimer, the term of this patent is extended or adjusted under 35 U.S.C. 154(b) by 400 days.

(21) Appl. No.: 13/062,383

(22) PCT Filed: Sep. 4, 2009

(86) PCT No.: PCT/IB2009/053875
§ 371 (c)(1),
(2), (4) Date: Jul. 21, 2011

(87) PCT Pub. No.: WO2010/026554
PCT Pub. Date: Mar. 11, 2010

(65) Prior Publication Data
US 2011/0265599 A1    Nov. 3, 2011

(30) Foreign Application Priority Data

Sep. 6, 2008 (GB) .................................. 0816354.5

(51) Int. Cl.
*B62D 1/185* (2006.01)
*B62D 1/184* (2006.01)
*B62D 1/19* (2006.01)

(52) U.S. Cl.
CPC .............. *B62D 1/184* (2013.01); *B62D 1/185* (2013.01); *B62D 1/195* (2013.01)

(58) Field of Classification Search
CPC ...... B62D 1/185; B62D 1/187; B62D 1/189; B62D 1/192
USPC .................... 74/492, 493, 495; 280/775, 779
See application file for complete search history.

(56) References Cited

U.S. PATENT DOCUMENTS 2,362,566 A * 11/1944 Lappert ........................... 384/97
3,923,319 A * 12/1975 Nonaka et al. ............... 280/777
(Continued)

FOREIGN PATENT DOCUMENTS

EP    0755843 A1    1/1997
JP    58-036761 A   3/1983
(Continued)

OTHER PUBLICATIONS

Search Report for GB0816354.5 dated Nov. 21, 2008.
(Continued)

*Primary Examiner* — William Kelleher
*Assistant Examiner* — Gregory Prather
(74) *Attorney, Agent, or Firm* — MacMillan, Sobanski & Todd, LLC

(57) ABSTRACT

A steering column assembly shroud includes a first member having an end portion which is received within a second member having at least one slit through its wall extending partially along its length. A guide bush is located between the first member and the second member and fixed relative to one of the members. The guide bush provides a surface over which the other member can slide to alter the overall length of the shroud. A clamp mechanism squeezes the second member onto the guide bush which is, in turn, squeezed onto the first member. The cross section of the guide bush varies along its length to vary the resistance it provides to crushing by the action of the clamp mechanism when the shroud is at its greatest length and the resistance it provides when the shroud is clamped at its shortest length.

8 Claims, 3 Drawing Sheets

(56) References Cited

U.S. PATENT DOCUMENTS

| | | | |
|---|---|---|---|
| 5,363,717 A | 11/1994 | Eichholz et al. | |
| 5,673,937 A * | 10/1997 | Fevre et al. | 280/777 |
| 5,722,300 A * | 3/1998 | Burkhard et al. | 74/493 |
| 5,758,545 A * | 6/1998 | Fevre et al. | 74/493 |
| 7,097,205 B2 * | 8/2006 | Camp et al. | 280/775 |
| 7,302,899 B2 * | 12/2007 | Zeiger | 114/144 R |
| 7,424,835 B2 * | 9/2008 | Adoline et al. | 74/493 |
| 7,581,466 B2 * | 9/2009 | Yoshioka et al. | 74/492 |
| 7,644,951 B2 * | 1/2010 | Fargeas et al. | 280/777 |
| 7,726,691 B2 * | 6/2010 | Yamada | 280/775 |
| 7,780,196 B2 * | 8/2010 | Cymbal et al. | 280/777 |
| 7,784,830 B2 * | 8/2010 | Ulintz | 280/775 |
| 7,874,588 B2 * | 1/2011 | Cymbal | 280/775 |
| 7,954,852 B2 * | 6/2011 | Ueno et al. | 280/775 |
| 8,123,251 B2 * | 2/2012 | Olgren et al. | 280/777 |
| 8,408,089 B2 * | 4/2013 | Oshita et al. | 74/492 |
| 2002/0030356 A1 * | 3/2002 | Bohlen et al. | 280/777 |
| 2006/0028010 A1 * | 2/2006 | Yamada | 280/775 |
| 2006/0163862 A1 * | 7/2006 | Satou et al. | 280/777 |
| 2006/0243088 A1 * | 11/2006 | Cymbal et al. | 74/492 |
| 2006/0267328 A1 * | 11/2006 | Eggers et al. | 280/775 |
| 2007/0137378 A1 * | 6/2007 | Bastein et al. | 74/493 |
| 2007/0151392 A1 * | 7/2007 | Oshita et al. | 74/493 |
| 2008/0196534 A1 | 8/2008 | Manwaring et al. | |

FOREIGN PATENT DOCUMENTS

| | | |
|---|---|---|
| JP | 07186973 A | 7/1995 |
| JP | 20000219139 A | 8/2000 |
| JP | 2007237900 A | 9/2007 |
| KR | 1019930017768 A | 9/1993 |
| KR | 1020080007973 A | 1/2008 |
| WO | 2007026114 A1 | 3/2007 |

OTHER PUBLICATIONS

Second Search Report for GB0816354.5 dated Jan. 14, 2009.
International Search Report for PCT/IB2009/053875 dated May 13, 2010.
Chinese Office Action, Application No. 200980141686.3 dated Oct. 10, 2012.
European Search Report, Application No. 09811185.9 dated Dec. 15, 2014.
Korean Office Action, Application No. 10-2011-7005318 dated Jun. 3, 2015.

* cited by examiner

STEERING COLUMN ASSEMBLY

CROSS-REFERENCE TO RELATED APPLICATIONS

This application is a national stage of International Application No. PCT/IB2009/053875 filed Sep. 4, 2009 which claims priority to Great Britain Patent Application No. 0816354.5 filed Sep. 6, 2008, both disclosures of which are incorporated herein by reference.

BACKGROUND OF THE INVENTION

This invention relates to improvements in steering column assemblies for vehicles.

It is known to provide a steering column assembly in which the steering shaft is adjustable for steering wheel height known as rake and for steering wheel distance known as reach. Such assemblies which provide both types of adjustment are known as double adjust assemblies. For reach adjustment the steering column has to be able to adjust in length. This can be achieved by providing a two part telescopic shroud in which an end part of an inner member is slidingly received within an outer member.

BRIEF SUMMARY OF THE INVENTION

According to a first aspect the invention provides a steering column assembly having a shroud comprising:
a first member and a second member, the first member having an end portion which is received within the second member, the second member having at least one slit through its wall extending partially along its length, a guide bush which comprises a sleeve that is located between an outward facing wall of the end portion of the first member and an inward facing wall of the second member, the guide bush being fixed relative to one of the members and providing a surface over which the other member can slide to alter the overall length of the shroud and having at least one slit extending through its wall along a part or all of its length, and
a clamp mechanism which in a clamped position squeezes the second member onto the guide bush which is in turn squeezed onto the first member so as to clamp the first member and second member together, wherein the cross section of the guide bush varies along its length such that the difference between the resistance it provides to crushing by the action of the clamp mechanism when the shroud is at its greatest length and the resistance it provides when the shroud is clamped at its shortest length is less than the difference that would be achieved if a guide bush of uniform material and having a uniform cross section along its length was provided.

By providing a varying cross section to the guide bush along its length so that a more uniform resistance to clamping is provided across the range of adjustment than a prior art uniform thickness bush provides, a better clamp feel for the driver and more controllable clamp force can be provided.

The cross section may be varied by providing a varying wall thickness to the guide bush along its length. By length we mean its dimension that is parallel to the direction of movement of the first member and second member relative to one another when adjusting the length of the shroud.

The guide bush may be shaped such that it has a greater wall thickness at or near one end than it does at or near the other end.

The guide bush may be tapered from one end to the other. The outer diameter of the guide bush may therefore reduce from one end to the other, or the effect could be achieved by increasing the inner diameter from one end to the other.

The effect of this change in wall thickness is to make the clamping action between the first member and second member more consistent with respect to different reach position adjustment settings. Without this, the clamp lever locking effort is sometimes found to be significantly lower at the reach-out end of the adjustment range than at the reach-in end, leading to a corresponding reduction of clamp bolt tension in the reach-out said position. This can be especially problematic in versions of the steering assembly which may not have positive locking (e.g. via teeth) of the adjustment position, and which therefore rely on frictional clamping only, the said reduction of clamp bolt tension could lead to there being an inadequate resistance to movement between the members. This might allow the column to slip when leaned on by the driver.

The rate of change of the wall thickness of the guide bush along its axial length may or may not be constant (i.e. may or may not be a straight taper), according to the desired characteristics.

The taper may provide a total change of approximately 0.25 mm in wall thickness from end to end.

The guide bush is preferably fixed to the second member in which case the preferred direction for the taper is one that results in the greater wall thickness occurring at the open end of the second tube as indicated by arrow Q in FIG. 1.

Alternatively the guide bush may be fixed to the outer surface of the first member. In that case the preferred direction for the taper may also one that results in the greater wall thickness occurring at the open end of the second member.

The first member and second member may be tubular, in which case the guide bush may also comprise a tube.

Other advantages of this invention will become apparent to those skilled in the art from the following detailed description of the preferred embodiments, when read in light of the accompanying drawings.

DETAILED DESCRIPTION OF THE INVENTION

Figure 1:
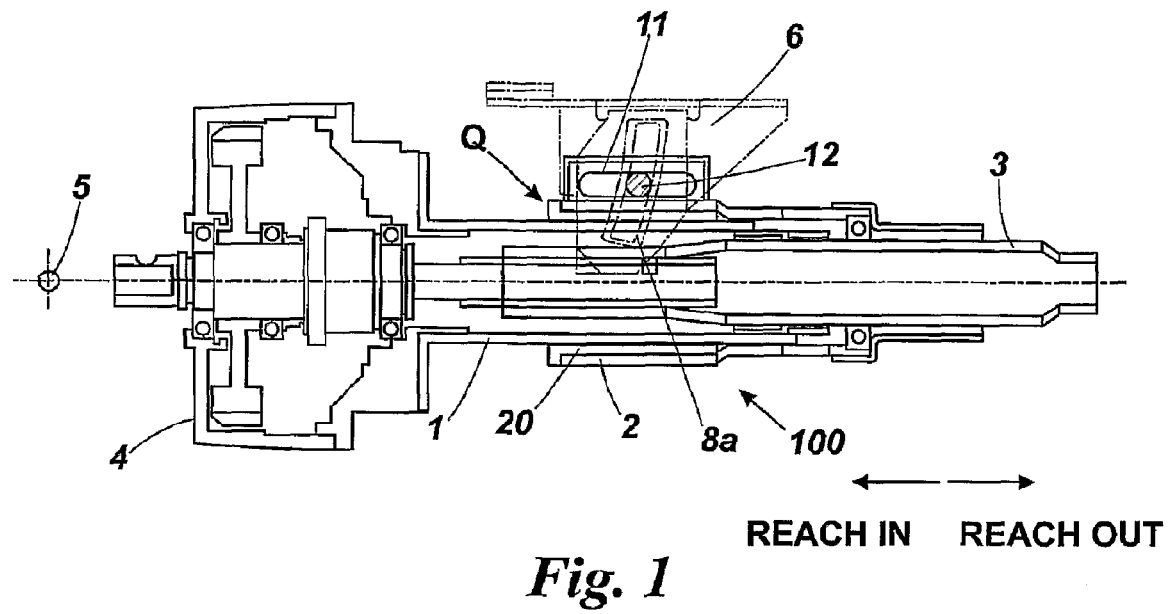
FIG. 1 is a cross sectional view of a steering column assembly.
Figure 2:
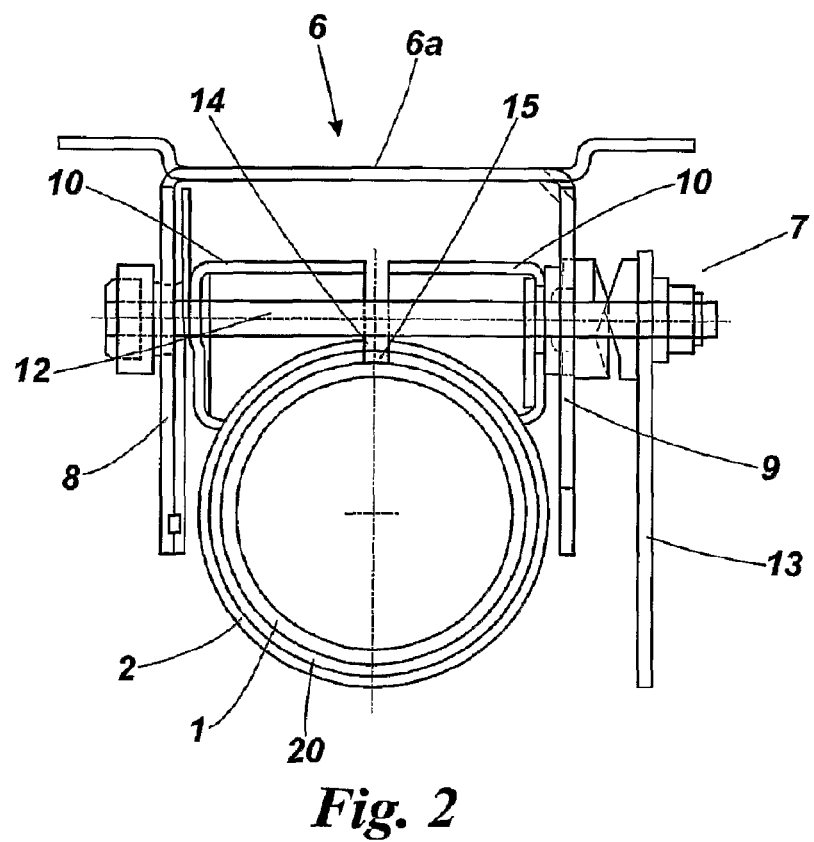
FIG. 2 is a view of the steering assembly showing a clamp mechanism which fixes the shroud of the assembly relative to the vehicle.

A steering column assembly 100 is shown in FIGS. 1 and 2 of the accompanying drawings. The assembly 100 comprises a shroud 1,2 which is fixed to the vehicle (not shown), a steering shaft 3 supported in bearings journaled to the shroud 1, 2, a steering wheel (not shown) connected to one end of the steering shaft 3, and an electric power assisted steering gearbox 4 connected to the end of the steering shaft 3 furthest from the steering wheel. The gearbox 4 connects the shaft 3 to a motor (not shown), which provides assistance when the driver tries to turn the wheel by applying a torque of the same sense as that applied by the driver. The gearbox 4 also connects the steering shaft 3 through further mechanical links such as a steering rack to the road wheels.

The shroud 1, 2 is fixed to the vehicle at one point by a pivot in the region of 5 close to the gearbox and at another point closer to the steering wheel in the region of 6 through an adjustable clamp mechanism 7 seen in FIG. 2. When released the clamp mechanism 7 enables the shroud 1,2 to tilt up and down about the pivot to provide rake adjustment of the steering wheel.

As can also be seen in FIG. 1, the shroud comprises a first (inner) member 1 and a second (outer) member 2, an end of the first member 1 being received partially within an end of the second member 2 and free to telescope relative to the second member 2 when the clamp mechanism 7 is released. Both members 1,2 are generally cylindrical metal tubes. As can be seen in FIG. 1 the inner diameter of the second member 2 is greater than the outer diameter of the first member 1, and a guide bush 20 comprising a cylindrical sleeve of low friction material (e.g. plastic) is located between them to fill the gap. The guide bush 20 is fixed to the inner wall of the second member 2 and is free to slide over the outer wall of the first member 1. The guide bush 20 has an axial slit 15 through its wall. The second member 2 can slide over the end of the first member 1 guided by the low friction guide bush 20. The steering shaft 3 is also provided in two parts which can telescope to follow changes in length of the shroud. This movement provides reach adjustment of the steering wheel.

The clamp mechanism 7 comprises a fixed bracket 6 which has an inverted U-shape in cross section (when viewed along the length of the shroud). The base 6a of the U-shaped bracket 6 is rigidly fixed to the vehicle body above the shroud 1,2 and has two arms 8,9 that depend down either side of the shroud. Clamp rails 10, visible in FIGS. 1 and 2, are welded to the top of the shroud along a length of the shroud which is surrounded by the arms of the fixed bracket 6. The clamp rails 10 are a snug fit within the arms of the bracket 6 so that the side walls of the clamp rail touch the inside of the arms of the bracket 6 and prevent excessive side to side movement of the shroud relative to the bracket 6. As shown the rails 10 are fixed to the top of the second member 2 of the shroud which has the larger diameter.

Each arm 8,9 of the bracket 6 is provided with a vertically extending elongate slot. One slot 8a in arm 8 can be seen in FIG. 1. Each side wall of the clamp rail 10 is provided with a substantially horizontal slot 11, as shown in FIG. 1. A clamp bolt 12 passes through the slots in the arms 8,9 and clamp rails 10 and is provided with a fixed nut on one end and an adjustable stop (comprising a fixed nut and a cam assembly) on the other operated by a hand lever 13. The driver can rotate the hand lever 13 to move the cam follower of the cam toward the fixed head at the other end of the clamp bolt 12. This clamps the arms 8, 9 of the bracket 6 to the side walls of the clamp rail 10 and locks the shroud 1,2 in place. At the same time, this action closes an axial slit 14 in the top of the second member 2 within the clamp rail 10, causing its inner diameter to reduce. This compresses the outer second member 2 onto the guide bush 20 and squeezes the guide bush 20 onto the inner first member 1, locking the second member 2 and first member 1 together.

The driver can also move the lever 13 to expand the distance between the fixed head and adjustable head which unclamps the bracket arms and clamp rail. In this condition the clamp bolt can slide up and down the vertical rails to give rake adjustment. The second member and the guide bush will no longer be crushed onto the first member and so they are free to move relative to the first member as the horizontal slots 11 move relative to clamp bolt to give reach adjustment.

Figure 3:
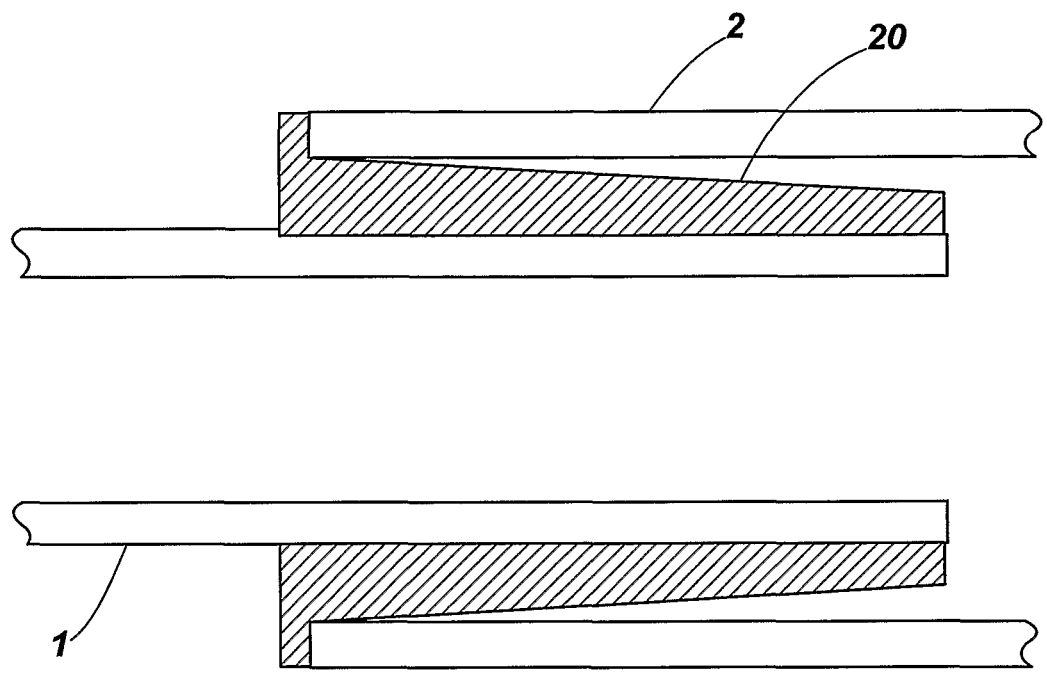
FIG. 3 is an enlarged view of the guide bush and its location relative to the ends of the inner and outer shroud members.

FIG. 3 shows the guide bush in cross section. It comprises a cylindrical tube having a relatively thin wall of plastic material. The wall of the tube tapers evenly from one end to the other. The inside surface of the guide bush is free to slide over the inner member of the shroud which is a snug fit within it. The outer surface of the guide bush is fixed to the inside surface of the outer member. The guide bush is located inside the portion of the outer member which is compressed by the clamp mechanism when locked.

Because the wall of the tube tapers in thickness the applicant has found that a more even clamp force, for various reach positions of the outer tube, is achieved than would be achieved if the guide bush had a uniform wall thickness along its length.

Figure 4:
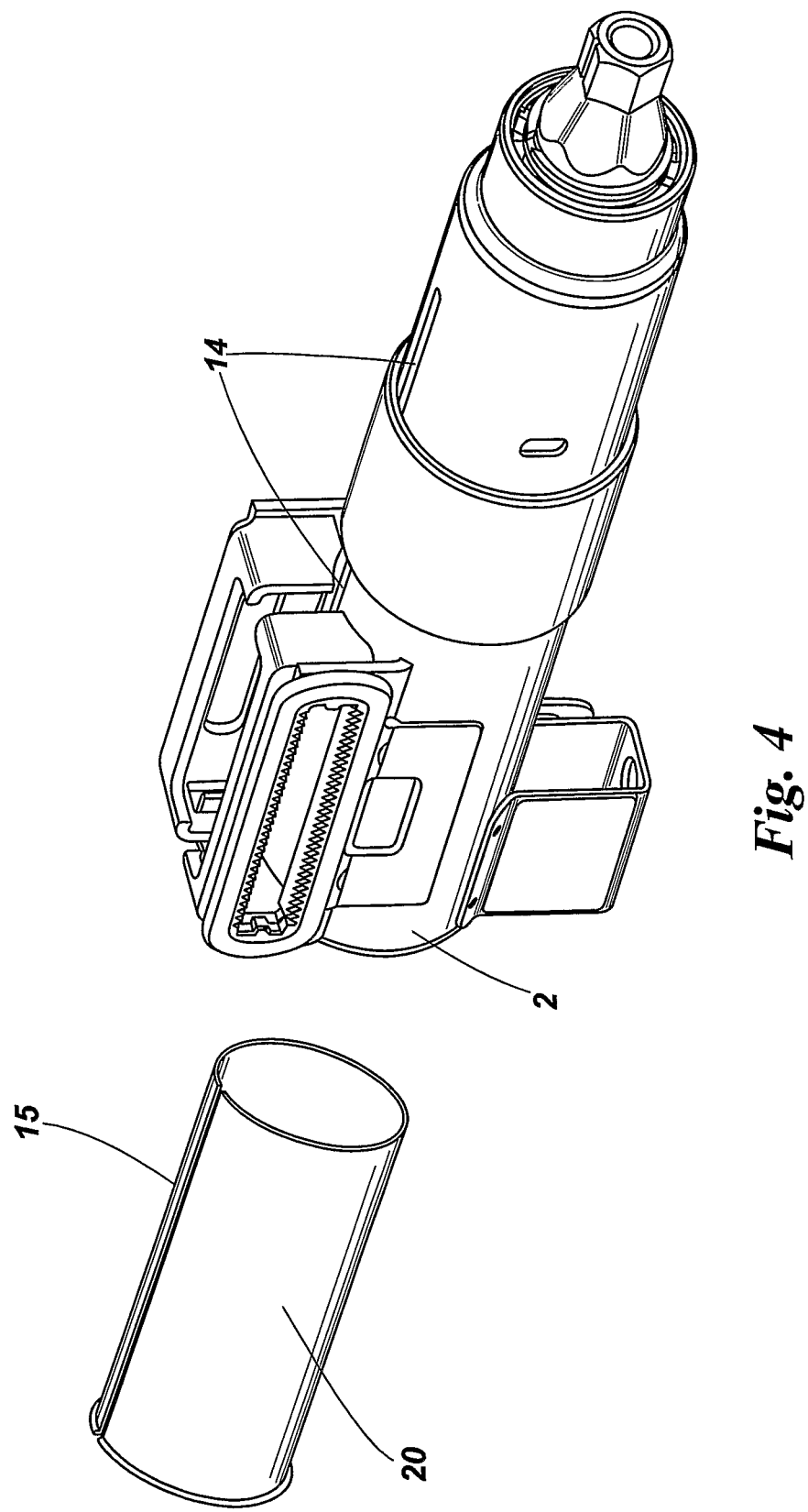
FIG. 4 is a view of part of the shroud assembly and a view of the guide bush before it is inserted into the said assembly.

FIG. 4 shows the relative positions of the slit 14 in the shroud second member 2 and the slit 15 in the guide bush 15. Slits 14 and 15 permit the clamping together of the first and second shroud members.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A steering column assembly shroud comprising:
a first member and a second member, said first member having an end portion which is received within said second member, said second member having at least one slit extending partially along a length thereof,
a guide bush which comprises a sleeve that is located between an outwardly facing wall of said end portion of said first member and an inwardly facing wall of said second member, said guide bush being fixed relative to one of said first member and said second member and providing a surface over which the other member can slide to alter an overall length of said first member and said second member, said guide bush further having at least one slit extending through its wall along at least a part of its length, and
a clamp mechanism which, in a clamped position, squeezes said second member onto said guide bush which is, in turn, squeezed onto said first member so as to clamp said first member and said second member together to prevent reach adjustment of said steering column assembly, and which, in an unclamped position, allows said one of said first member and second member to which said guide bush is fixed to move relative to the clamp mechanism to permit reach adjustment of said steering column assembly,
wherein a cross section of said guide bush varies along its length such that a difference between a first resistance that said guide bush provides to crushing by said clamp mechanism when the overall length of said first member and said second member is at a greatest length and a second resistance that said guide bush provides to crushing by said clamp mechanism when the overall length of said first member and said second member is at a shortest length is less than a difference that would be achieved if a guide bush of uniform material and having a uniform cross section along its length was provided.

2. A steering column assembly according to claim 1 wherein said cross section is varied by providing a varying wall thickness to said guide bush along at least a part of its length.

3. A steering column assembly according to claim 1 wherein said guide bush is shaped such that it has a greater wall thickness near one end than it does near the other end.

4. A steering column assembly according to claim 1 wherein said guide bush is tapered from one end to another.

5. A steering column assembly according to claim 4 wherein said taper provides a total change in wall thickness of approximately 0.25 mm from end to end.

6. A steering column assembly according to claim 4 wherein said guide bush is fixed to said second member and a direction for the taper is one that results in a greater wall thickness occurring at an open end of said second member.

7. A steering column assembly shroud comprising:
a first member including an outer surface;
a guide bush including an inner surface that is supported on the outer surface of the first member, an outer surface, and a slit;
a second member including an inner surface that is supported on the outer surface of the guide bush and a slit; and
a clamp mechanism that is operable in an unlocked condition, wherein the first and second members are movable relative to one another, and a locked condition, wherein the first and second members are not movable relative to one another;
wherein the guide bush has a portion that is located within the clamp mechanism and that varies in cross sectional shape such that a difference between a first resistance that the guide bush provides to crushing by the clamp mechanism when the overall length of the first and second members is relatively large and a second resistance that the guide bush provides to crushing by the clamp mechanism when the overall length of the first and second members is relatively small is less than a difference that would be achieved if the guide bush had a uniform cross sectional shape.

8. A steering column assembly shroud comprising:
a first member including an outer surface;
a guide bush including an inner surface that is supported on the outer surface of the first member, an outer surface, and a slit;
a second member including an inner surface that is supported on the outer surface of the guide bush and a slit; and
a clamp mechanism that is operable in an unlocked condition, wherein the first and second members are movable relative to one another, and a locked condition, wherein the first and second members are not movable relative to one another;
wherein the guide bush has a portion that is located within the clamp mechanism and has a tapered cross sectional shape.

* * * * *